United States Patent [19]

Bredal

[11] 4,305,504
[45] Dec. 15, 1981

[54] SALES PACKING OF THE BLISTER TYPE

[75] Inventor: Torben Bredal, Odense, Denmark

[73] Assignee: Niels Ibsen, Odense, Denmark

[21] Appl. No.: 193,267

[22] PCT Filed: Sep. 21, 1979

[86] PCT No.: PCT/DK79/00035
§ 371 Date: May 22, 1980
§ 102(e) Date: May 22, 1980

[87] PCT Pub. No.: WO80/00689
PCT Pub. Date: Apr. 17, 1980

[30] Foreign Application Priority Data

Sep. 22, 1978 [GB] United Kingdom ............... 37748/78

[51] Int. Cl.³ ............................................. B65D 69/00
[52] U.S. Cl. ................................... 206/577; 206/467;
206/468; 220/4 R; 220/345
[58] Field of Search ............... 206/467, 468, 216, 223,
206/577; 220/4, 345, 346, 347

[56] References Cited

U.S. PATENT DOCUMENTS 3,217,867 11/1965 Harris .................................. 206/468
3,754,641 8/1973 Koch ................................... 206/468
3,939,979 2/1976 Neumayer ........................... 206/468
4,095,690 6/1978 Baldwin .............................. 206/223
4,167,903 9/1979 Lasher ................................. 206/577

Primary Examiner—Joseph Man-Fu Moy
Attorney, Agent, or Firm—Craig and Antonelli

[57] ABSTRACT

A sale packing of the blister type comprises a backing plate having undercut side edge recesses for receiving and holding opposed edge flange portions of a domed front cover. The backing plate along at least one edge is additionally provided with protruding edge flange operable to be received in one of the underout edge recesses of a similar backing plate of another corresponding packing by insertion of the edge flange for edgewise joining the two backing plates as separate elements perpendicular to each other. The four similar backing plates are joinable into a square tube element. The backing plates further have at least at one side thereof a number of ribs or grooves extends parallel with the backing plate side edges in such a manner that these ribs or grooves of opposed inner walls of square tube element are operable to support the opposed edge flange portions of one or more of the front covers to enable these as separate elements to be mounted in a drawer-like manner in the square tube element.

5 Claims, 6 Drawing Figures

SALES PACKING OF THE BLISTER TYPE

The present invention relates to a sales packing of the blister type and of the kind comprising a backing plate having undercut side edge recesses for receiving opposed edge flange portions of a dome shaped front cover.

Packings of this type are used mainly as sales packings for small amounts of articles such as screws, buttons etc., and even though the most common blister packings are made of a cardboard backing plate and a dome shaped front cover e.g. of a vacuum shaped transparent plastic sheet material secured to the backing plate e.g. by means of glue and covering the articles in question, it is nevertheless known in the art to make use of a die cast plastic backing plate and even a correspondingly die cast front cover which is joined with the backing plate by a relative mounting displacement movement, whereby the said edge flange portions of the front cover are brought into holding engagement with the said side edge recesses of the backing plate. Such packings are of high quality and are easy to open by a return displacement of the front cover.

The invention is based on the cognition that such packings are openable without the packing elements being demolished and that the packing elements are of such high quality that upon the opening of the packing they ought to be reusable for some qualified purpose.

On this background the invention seeks to provide a packing of the kind referred to, which is designed in a simple manner so as to enable the packing elements, i.e. the backing plate and the front cover, respectively, to be reusable for a reasonably relevant purpose.

The packing according to the invention is characterized by the features stated in the characterizing clause of claim 1. From this it will be clear that the customer, upon having procured and opened more similar packings of this design, will be able to join four of the associated backing plates into a rigid square tubular structure which is able to receive all or some of the associated front cover elements as drawers in a small chest-of-drawers, the front cover elements being horizontally insertable in the lying square tube with the dome portion constituting an upwardly open bowl or box member and slidingly supported by the ribs or grooves of the opposed tube walls, which may now cooperate with the same protruding edge flange portions of the front cover element as originally used in the packing for holding the front cover element against the associated backing plate.

In the following the invention is described in more detail with reference to the accompanying drawing, in which.

Figure 1:
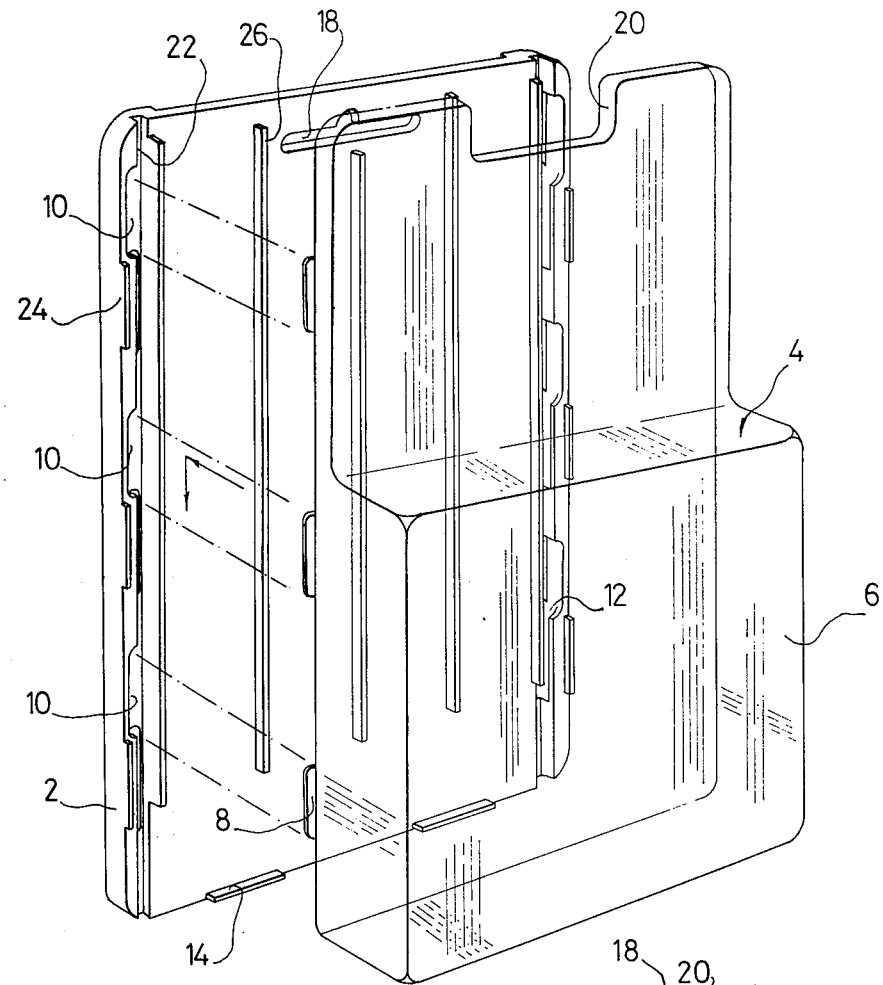
FIG. 1 is an exploded view of a packing according to the invention.
Figure 2:
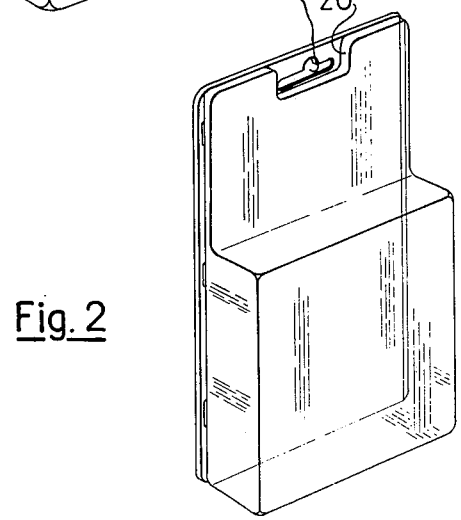
FIG. 2 is a perspective view of the assembled packing.

The packing shown in FIGS. 1 and 2 consists of a backing plate 2 and a transparent front cover member 4, the latter having a dome portion 6 and being provided with several outwardly protruding wing portions 8 along its opposed side edges. The corresponding side edges of the backing plate 2 are shaped as relatively thick portions provided with notches 10 for receiving the wing portions 8. As seen downwardly from each of the notches 10 the side edge material of the backing plate 2 is provided with undercut grooves 12 enabling the wings 8, once inserted into the notches 10, to be displaced into the grooves 12 by a generally downward displacement of the front cover member 4, whereby this member will be firmly locked to the backing plate, with relevant articles located inside the dome portion 6. The length of the undercut grooves 12 is chosen so as to enable a displacement of the front cover member 4 just corresponding to its reaching a final position in which its circumference coincides with the circumference of the backing plate member. Additional stop means for the displacement of the front cover member 4 are constituted by forwardly protruding rib members 14 located adjacent the bottom edge of the backing member 2.

Both members 2 and 4 are produced by die casting, and in order to provide for the undercut grooves 12 in an easy manner there is provided, underneath each of these grooves, an elongated hole 16 (seen most clearly in FIG. 3) representing the use of a corresponding core member in the mould in which the backing plate member is produced.

Topwise the backing plate is provided with a suspension hole 18, and the cover member has a recess 20 which, in the joined condition of the members (FIG. 2), leaves the hole 18 free to be received on a suspension hook or rod. On the other hand the recess 20 terminates just below the hole 18, whereby the cover member cannot be released from the backing plate as long as the packing is suspended by some member extending through the hole.

For opening the packing it will otherwise be sufficient to displace the cover member a short distance upwardly.

Figure 3:
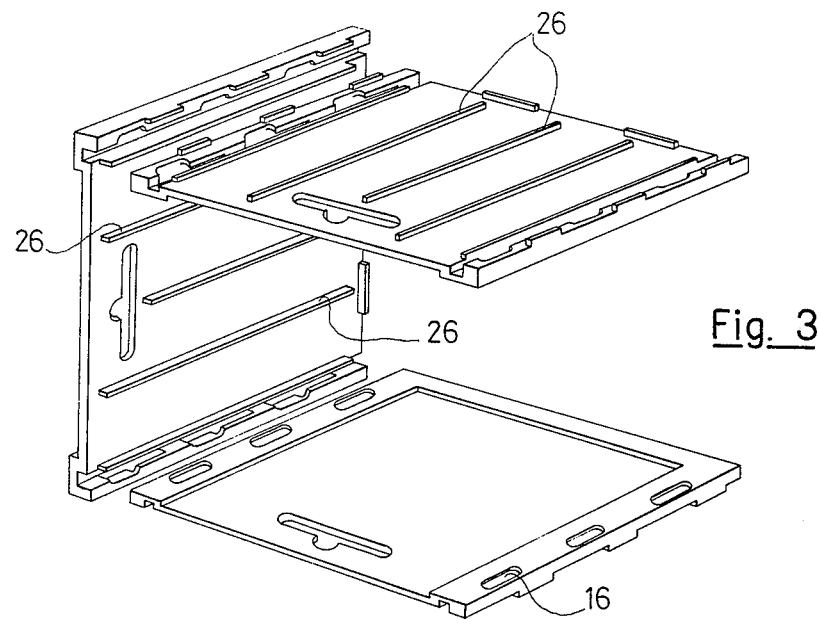
FIG. 3 is a perspective view illustrating the possibility of joining several backing plate members.

As shown in FIGS. 1 and 3 the backing plate or plates from several packings are provided with edge grooves 22 and forwardly protruding edge tabs 24, the latter being provided as integral plate portion and located just outside the groove spaces 12 in which the wings 8 are received in the closed condition of the packing. As illustrated most clearly in FIGS. 3 and 4 the arrangement is such that one backing plate may be edged into the groove 22 of another backing plate with its tabs 24 inserted into the respective recesses 10 of the other plate, whereafter the plates may be locked together by a mutual displacement corresponding to the mounting of the front cover member. In this manner it is possible to assemble a square tube member by means of the backing plates from four packings, and as shown in FIG. 4 it will even be possible to join any number of plates into a cellular structure.

Figure 4:
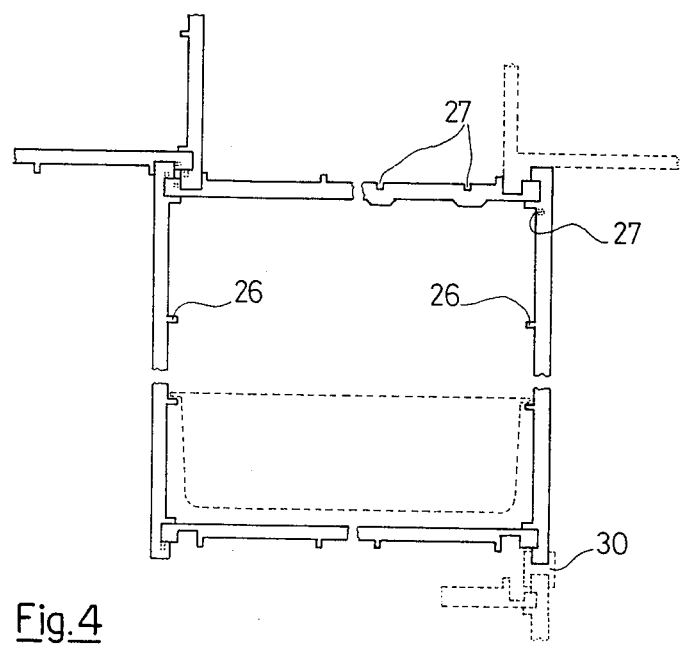
FIG. 4 is a plan front view of a frame structure made of several backing plate members.
Figure 5:
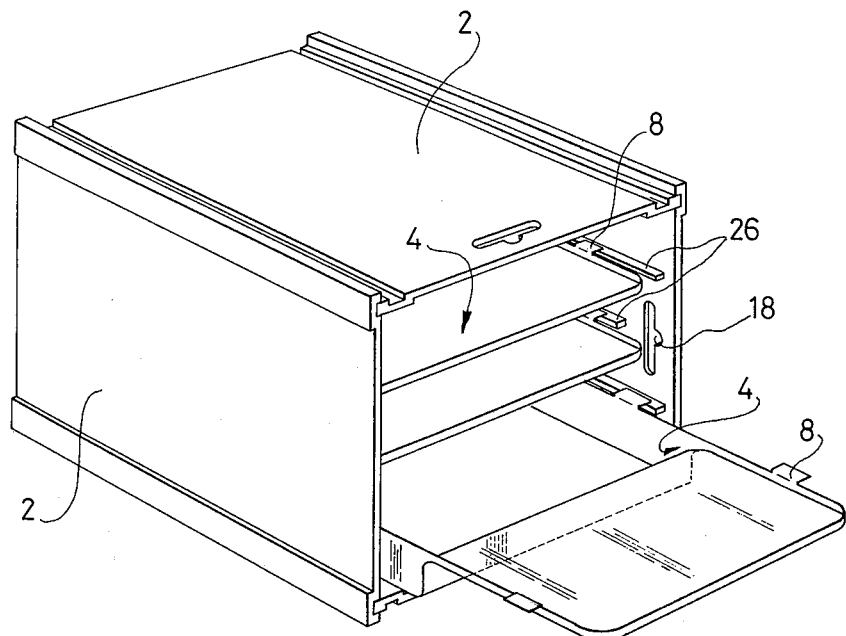
FIG. 5 is a perspective view of a chest-of-drawers as built up from the elements of several packings.

The front side of each backing plate is provided with a number of parallel ribs 26, and according to FIGS. 3 and 4 the backing plates are assembled in such a manner that these ribs are located on the outside of the top and bottom plate element, while they are located on the inside of the vertical side wall elements of the tube structure, extending generally as horizontal ribs opposed to each other. The horizontal distance between the said side walls will be only slightly longer than the complete width of the front cover member including the wings 8, and it will be appreciated that it is hereafter possible to introduce a number of front cover members into the tube structure and make them supported by their wings 10 on the ribs 26, as shown in dotted lines in FIG. 4 and in full lines in FIG. 5, whereby a small chest-of-drawers is provided.

Figure 6:
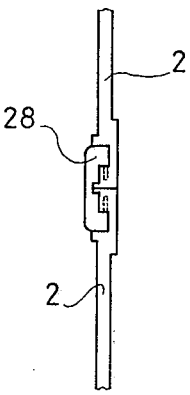
FIG. 6 is an end view of an alternative plate edge joint.

An important and even preferred modification is that the support ribs 26 may be replaced by corresponding grooves as shown at 27 in FIG. 4, whereby of course the spacing between the opposed walls of the square tube or the width of the front cover elements should be adapted correspondingly. Many other modifications will be possible within the scope of the invention, and the packings may even include special auxiliary equipment for further widening the field of reuse possibilities. As a relevant example may be mentioned a clip or cleat element usable for edgewise joining two backing plates flush with each other, e.g. as shown in FIG. 6 illustrating a C-profiled joining clip or cleat 28, or as shown in dotted lines at the lower right hand corner of FIG. 4, where a corresponding, but H-profiled joining member 30 is shown holding one square tube element on the top of a similar element.

The front cover element 4 of the sales packing, see FIGS. 1 and 2, has an uppermost flat portion 7 normally used to cover some commercial print on a sheet of paper enclosed in the packing. This portion is well suited to form a handle on the elements when used as drawers, but of course they involve a restriction of the usable drawer area. Provisions may be made, therefore, to facilitate a separation between the portions 6 and 7, e.g. by breaking off the portion 7, whereafter a plurality of remaining dome portions 6 may be used as short drawers inserted from both ends of the square tube support element. Even the broken off flat portions 7 may be reusable, e.g. as shelves in a square tube element.

I claim:

1. A sales packing of the blister type and of the kind comprising a backing plate (2) having undercut side edge recesses (12) for receiving and holding opposed edge flange portions (8) of a domed front cover (4), characterized in that the backing plate (2) along at least one edge thereof is additionally provided with protruding edge flange means (24) operable to be received in a said undercut edge recess (12) of a similar backing plate of another corresponding packing by insertion of the edge flange means (24) for edgewise joining the two backing plates as separate elements perpendicular to each other, such that four similar backing plates are joinable into a square tube element, said backing plates (2) further having at least at one side thereof a number of ribs or grooves (26,27) extending parallel with the backing plate side edges in such a manner that these ribs (26) or grooves (27) of opposed inner walls of said square tube element are operable to support the said opposed edge flange portions (8) of one or more of said front covers (4) to enable these as separate elements to be mounted in a drawer-like manner in the square tube element.

2. A packing according to claim 1, characterized in that the edge flange portions of the front cover along each side thereof are constituted by mutually spaced flange portions or wing members (8), that the edge portions of the backing plate are provided with correspondingly interspaced introduction openings (10) in the edge wall portion outside the otherwise undercut edge recess (12), and that the said edge flange means of the backing plate are correspondingly constituted by mutually spaced rib portions (24) which in the edge direction are offset from the said introduction openings (10).

3. A packing according to claim 1 or 2, characterized in that the backing plate (2) is provided with said edge flange means (10) along both opposed side edges, the edge flange means (24) and the edge recesses (12) being located so as to enable four backing plates to be edgewise joined with cross shape.

4. A packing according to claim 1, characterized in that at one end of the backing plate (2) there is provided a stop member (14) operable to limit the insertion movement of the front cover (4) at least when inserted as a drawer in a position generally perpendicular to the backing plate.

5. A packing according to claim 1, 2 or 3, characterized in that it comprises as an auxiliary a joining element (28,30) operable to join two similar backing plates (2) flush with each other.

* * * * *